(12) United States Patent
Yu et al.

(10) Patent No.: US 12,112,756 B2
(45) Date of Patent: Oct. 8, 2024

(54) VOICE INTERACTION WAKEUP ELECTRONIC DEVICE, METHOD AND MEDIUM BASED ON MOUTH-COVERING ACTION RECOGNITION

(71) Applicant: TSINGHUA UNIVERSITY, Beijing (CN)

(72) Inventors: Chun Yu, Beijing (CN); Yuanchun Shi, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 384 days.

(21) Appl. No.: 17/616,075

(22) PCT Filed: May 26, 2020

(86) PCT No.: PCT/CN2020/092190
§ 371 (c)(1),
(2) Date: Dec. 2, 2021

(87) PCT Pub. No.: WO2020/244410
PCT Pub. Date: Dec. 10, 2020

(65) Prior Publication Data
US 2022/0319520 A1 Oct. 6, 2022

(30) Foreign Application Priority Data
Jun. 3, 2019 (CN) .......................... 201910475947.0

(51) Int. Cl.
*G10L 15/25* (2013.01)
*G06F 3/01* (2006.01)
(Continued)

(52) U.S. Cl.
CPC .............. *G10L 15/25* (2013.01); *G06F 3/017* (2013.01); *G06V 40/28* (2022.01); *G10L 15/22* (2013.01);
(Continued)

(58) Field of Classification Search
CPC ......... G10L 15/25; G10L 15/22; G10L 25/18; G10L 2015/223; G06V 40/28;
(Continued)

(56) References Cited

U.S. PATENT DOCUMENTS

| 9,443,536 | B2 | 9/2016 | Cho et al. | |
|---|---|---|---|---|
| 2014/0214424 | A1* | 7/2014 | Wang ................... | G06V 40/172 704/246 |

(Continued)

FOREIGN PATENT DOCUMENTS

| AU | 2014201588 A1 * | 10/2014 | ............. G06F 3/011 |
|---|---|---|---|
| CA | 2979560 C * | 11/2023 | ............. A63F 13/211 |

(Continued)

OTHER PUBLICATIONS

International Search Report PCT/CN2020/092190 (Sep. 3, 2020).

*Primary Examiner* — Mohammad K Islam
(74) *Attorney, Agent, or Firm* — Merchant & Gould P.C.

(57) ABSTRACT

An interaction method triggered by a mouth-covering gesture and an intelligent electronic device are provided. The interaction method is applied to an intelligent electronic device arranged with a sensor. The intelligent electronic device includes a sensor system for capturing a signal of a user putting one hand on a mouth to make a mouth-covering gesture. The interaction method includes: processing the signal to determine whether the user puts the hand on the mouth to make the mouth-covering gesture; and in a case that the user puts the hand on the mouth to make the mouth-covering gesture, determining a mouth-covering gesture input mode as an input mode for controlling an interaction to trigger a control command or trigger another input mode, by executing a program on the intelligent electronic device.

18 Claims, 3 Drawing Sheets

(51) Int. Cl.
  *G06V 40/20* (2022.01)
  *G10L 15/22* (2006.01)
  *G10L 25/18* (2013.01)
  *H04R 1/10* (2006.01)
  *H04R 1/40* (2006.01)
  *H04R 3/00* (2006.01)

(52) U.S. Cl.
  CPC ............ *G10L 25/18* (2013.01); *H04R 1/1041* (2013.01); *H04R 1/406* (2013.01); *H04R 3/005* (2013.01); *G10L 2015/223* (2013.01); *H04R 2420/07* (2013.01)

(58) Field of Classification Search
  CPC ....... G06F 3/017; H04R 1/1041; H04R 1/406; H04R 3/005; H04R 2420/07
  See application file for complete search history.

(56) References Cited

U.S. PATENT DOCUMENTS

| | | | |
|---|---|---|---|
| 2015/0177841 A1 | 6/2015 | VanBlon et al. | |
| 2015/0262005 A1 | 9/2015 | Ohmura et al. | |
| 2017/0109936 A1* | 4/2017 | Powderly | G06F 3/0346 |
| 2018/0286404 A1* | 10/2018 | Cech | G06T 7/254 |
| 2019/0228217 A1 | 7/2019 | Gao | |
| 2020/0050256 A1* | 2/2020 | Yamamoto | G06F 3/0346 |
| 2020/0110928 A1* | 4/2020 | Al Jazaery | G05B 19/042 |
| 2020/0249752 A1* | 8/2020 | Parshionikar | G06F 1/163 |

FOREIGN PATENT DOCUMENTS

| | | | | |
|---|---|---|---|---|
| CN | 102778858 A | * | 11/2012 | ........... G05B 19/409 |
| CN | 104731315 A | | 6/2015 | |
| CN | 104781782 A | | 7/2015 | |
| CN | 105074817 A | * | 11/2015 | ............. G06F 3/017 |
| CN | 105934775 A | * | 9/2016 | ......... G02B 27/0093 |
| CN | 106155311 A | * | 11/2016 | ............. G06F 3/011 |
| CN | 106774917 A | * | 5/2017 | ............. G06F 3/014 |
| CN | 108181992 A | | 6/2018 | |
| CN | 110164440 A | | 8/2019 | |
| CN | 110581947 A | * | 12/2019 | ............. G06F 3/014 |
| CN | 111432303 A | | 7/2020 | |
| CN | 112596605 A | * | 4/2021 | ............. G06V 40/28 |
| DE | 102013001331 A1 | | 7/2014 | |
| EP | 3660633 A1 | * | 6/2020 | ............. G06F 1/163 |
| JP | 3997392 B2 | * | 10/2007 | ............. G06F 3/011 |
| KR | 20210010437 A | * | 5/2019 | ............. G06F 3/017 |
| WO | WO-2011085813 A1 | * | 7/2011 | ............. A61B 34/20 |

* cited by examiner

VOICE INTERACTION WAKEUP ELECTRONIC DEVICE, METHOD AND MEDIUM BASED ON MOUTH-COVERING ACTION RECOGNITION

The present application is the national phase of International Patent Application No. PCT/CN2020/092190, titled "VOICE INTERACTION WAKEUP ELECTRONIC DEVICE, METHOD AND MEDIUM BASED ON MOUTH-COVERING ACTION RECOGNITION", filed on May 26, 2020, which claims priority to Chinese Patent Application No. 201910475947.0, titled "VOICE INTERACTION WAKEUP ELECTRONIC DEVICE, METHOD AND MEDIUM BASED ON MOUTH-COVERING ACTION RECOGNITION", filed on Jun. 3, 2019 with the Chinese Patent Office, both of which are incorporated herein by reference in their entireties.

FIELD

The present disclosure generally relates to a control and interaction method performed by an intelligent electronic portable device.

BACKGROUND

With the development of computer technology, voice recognition algorithms gradually mature. Voice input is becoming important in interaction due to high naturalness and effectiveness. The user may interact with a mobile device (such as a mobile phone and a watch) by inputting voice to perform various tasks such as command input, information query, and voice chat.

With the development of computer technology, intelligent electronic portable devices are widely used. The user may control an intelligent device by inputting a control command or interact with the intelligent device by inputting a voice, an image and other modalities, so as to perform various tasks such as command input and information query.

However, as for when to trigger a control command or a modality information input such as voice, the solutions according to the conventional technology have disadvantages.

1. Triggering by a Physical Button

A command is triggered or a modality information input such as voice is activated by pressing (or pressing and holding) one (or some) physical button of a mobile device.

This solution has the following disadvantages. A physical button is required. It is easy to perform triggering by mistake. It is required for the user to press the physical button.

2. Triggering by an Interface Element

A command is triggered or a modality information input such as voice is activated by clicking (or clicking and holding) an interface element (such as an icon) on a screen of the mobile device.

This solution has the following disadvantages. It is required for the device to have a screen. The trigger element occupies the screen. Due to the limitation of the software UI, the triggering process may be cumbersome. It is easy to perform triggering by mistake.

3. Triggering by Detecting a Wakeup Word (Voice)

For triggering of a voice input, the voice input is activated by detecting a wakeup word, where the wakeup word is a specific word (such as a nickname of a product).

This solution has the following disadvantages. The privacy and sociality are poor. The interaction efficiency is low. The wakeup words included in daily communication of the user may cause problems such as false triggering.

SUMMARY

In view of the above, the present disclosure is provided.

According to an aspect of the present disclosure, an intelligent electronic portable device is provided. The intelligent electronic portable device includes a sensor system, a memory and a processor. The sensor system is configured to capture a signal for determining that a user puts a hand on a mouth of the user to make a mouth-covering gesture. The memory stores computer executable instructions. The computer executable instructions, when executed by the processor, cause the processor to perform an interaction method. The interaction method includes: processing the signal to determine whether the user puts the hand on the mouth to make the mouth-covering gesture; and in a case that the user puts the hand on the mouth to make the mouth-covering gesture, determining a mouth-covering gesture input mode as an input mode for controlling an interaction to trigger a control command or trigger another input mode, by executing a program on the intelligent electronic device.

In an embodiment, the mouth-covering gesture is one of a mouth-covering gesture with a left hand and a mouth-covering gesture with a right hand.

In an embodiment, the mouth-covering gesture, according to a position of a palm relative to the mouth, is one of a mouth-covering gesture with the palm locating at a position between the mouth and a left ear, a mouth-covering gesture with the palm locating at a position between the mouth and a right ear, and a mouth-covering gesture with the palm locating at a position in front of the mouth.

In an embodiment, the mouth-covering gesture is one of a mouth-covering gesture with touching a face and a mouth-covering gesture without touching a face.

In an embodiment, the mouth-covering gesture includes but is not limited to: a mouth-covering gesture with the palm covering the whole mouth; a mouth-covering gesture with a thumb being in contact with a side of the mouth, an index finger being on top of lips and the mouth exposed below the palm; a mouth-covering gesture with the thumb being in contact with a lower jaw, the index finger being on top of the lips and the mouth exposed below the palm; and a mouth-covering gesture with the thumb being in contact with the side of the mouth, a little finger touching the lower jaw and the mouth exposed above the palm.

In an embodiment, the intelligent electronic device is configured, in a case that the intelligent electronic device determines that the mouth-covering gesture is a predetermined mouth-covering gesture, to execute a control command.

In an embodiment, the control command is executed to trigger the another input mode except the mouth-covering gesture input mode, that is, information inputted in the another input mode is processed.

In an embodiment, the another input mode include one or a combination of a voice input mode, a non-mouth-covering gesture input mode, a sight input mode, a blink input mode, and a head movement input mode.

In an embodiment, the intelligent electronic device is configured to: process the signal to determine whether the user stops making the mouth-covering gesture; and end the interaction in a case that the user stops making the mouth-covering gesture.

In an embodiment, the intelligent electronic device is configured to provide a visual feedback or an auditory feedback to prompt the user that the intelligent electronic device triggers the another input mode.

In an embodiment, the intelligent electronic device is configured, in a case that the triggered another input mode is a voice input mode, to process a voice input from the user keeping the mouth-covering gesture.

In an embodiment, the intelligent electronic device is configured, in a case that the signal based on which it is determined that the user makes the mouth-covering gesture comprises a voice signal of the user, to process the voice signal as the voice input.

In an embodiment, the intelligent electronic device is a mobile phone provided with a sensor of a binaural Bluetooth headset, a wired headset or a camera.

In an embodiment, the intelligent electronic device is an intelligent wearable device of a watch, an intelligent ring or a wristwatch.

In an embodiment, the intelligent electronic device is a head-mounted intelligent display device provided with a microphone or a multi-microphone group.

In an embodiment, the sensor system includes one or more of: a camera, an infrared camera, a depth camera, a microphone, a dual-microphone group, a multi-microphone group, a proximity-sensor, and an accelerometer.

In an embodiment, the signal captured by the sensor system includes a face image captured by a camera.

In an embodiment, the intelligent electronic device is configured, in a case that the signal includes the face image captured by the camera, to recognize one or more types of the mouth-covering gesture made by the user.

In an embodiment, the intelligent electronic device is an intelligent phone, and the camera includes a front camera of the intelligent phone.

In an embodiment, features of the signal captured by the sensor system include one or more of a time domain feature, a frequency spectrum feature, and a sound source position feature of a sound signal received by a single microphone.

In an embodiment, the microphone is a microphone on a mobile phone and/or a microphone on a wire-controlled headset.

In an embodiment, features of the signal captured by the sensor system include differences of features of sound signals received by multiple microphones.

In an embodiment, the intelligent electronic device is configured, in a case that a sensing device is a wireless Bluetooth headset, to recognize the mouth-covering gesture based on a difference between a signal of a left headphone and a signal of a right headphone.

In an embodiment, the signal is captured by a proximity light sensor on an intelligent ring.

According to another aspect of the present disclosure, an interaction method performed by an intelligent electronic device is provided. The intelligent electronic device includes a sensor system configured to capture a signal of a user putting one hand on a mouth to make a mouth-covering gesture. The interaction method performed by the intelligent electronic device includes: processing the signal to determine that the user puts one hand on the mouth to make the mouth-covering gesture; in a case that the user keep the mouth-covering gesture with a hand on the mouth, analyzing an interaction intention of the user based on the mouth-covering gesture, an interaction content of a current application on the intelligent device and information of another input from the user; based on the analyzed interaction intention, receiving and analyzing, by the intelligent device, information inputted by the user, and outputting, by the intelligent device, a corresponding content; in a case that the user performs interaction with the intelligent device based on the mouth-covering gesture, processing the signal to determine that the user stops making the mouth-covering gesture; and ending the interaction in a case that the user stops making the mouth-covering gesture.

In an embodiment, the outputted content includes one or a combination of a voice and an image.

In an embodiment, the information inputted by the user includes information of the mouth-covering gesture and other modal information of the user.

In an embodiment, the other modal information includes voice information or eye contact information.

According to another aspect of the present disclosure, a computer readable medium is provided. The computer readable medium stores computer executable instructions. The computer executable instructions, when executed by a computer, cause the computer to perform the voice interaction wakeup method described above.

The technical solutions according to the embodiments of the present disclosure have one or more of the following advantages.

1. Natural interaction. Interaction is triggered by the user making a mouth-covering gesture, conforming to the habits and cognition of the user.

2. High efficiency. Operation can be performed with one hand. It is unnecessary for the user to operate the device, switch between different user interfaces/applications, hold down a button, or repeat a wake-up word. It is only required for the user to raise a hand to the mouth.

3. High privacy and sociality. The user makes a mouth-covering gesture and inputs voice, causing little interference to others, achieving privacy protection, and reducing psychological burden of the user inputting voice.

BRIEF DESCRIPTION OF THE DRAWINGS

Based on the following detailed description of the embodiments of the present disclosure in conjunction with the drawings, the above and/or other objects, features and advantages of the present disclosure will be clear and easy to be understood. In the drawings.

DETAILED DESCRIPTION OF EMBODIMENTS

In order that those skilled in the art may better understand the present disclosure, the present disclosure is described in detail hereinafter in conjunction with the drawings and the embodiments.

Firstly, terms in the present disclosure are described.

Unless otherwise specified, a camera in the present disclosure refers to an ordinary camera and does not include an infrared camera.

Figure 1:
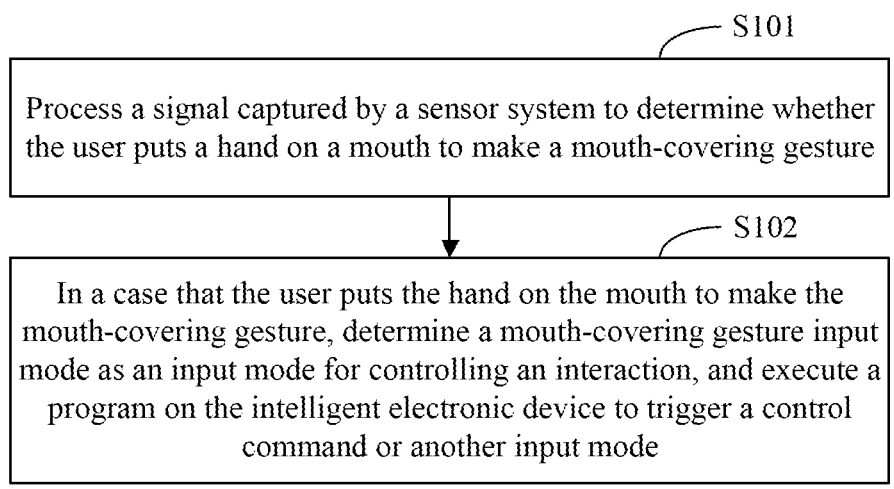
FIG. 1 is a flowchart of a voice input interaction method according to an embodiment of the present disclosure.

FIG. 1 is a flowchart of an interaction method in which an intelligent electronic device starts an interaction with a user by determining that the user makes a mouth-covering gesture and ends the interaction with the user by determining that the user stops making the mouth-covering gesture according to an embodiment of the present disclosure. The intelligent electronic portable device includes a sensor system configured to capture a signal for determining that the user puts a hand on the mouth to make a mouth-covering gesture or the user stops making a mouth-covering gesture. The sensor system includes one or more of: a camera, an infrared camera, a microphone, a dual-microphone group, a multi-microphone group, a proximity sensor and an accelerometer.

The interaction herein may include but is not limited to: a voice interaction, an eye interaction, and a gesture interaction.

It should be noted that according to an embodiment of the present disclosure, taking the voice interaction as an example, it is only required for the user to put a hand on the mouth to make a mouth-covering gesture to perform a voice interaction and to put down the hand to stop making the mouth-covering gesture to end the voice interaction.

As shown in FIG. 1, in step S101, the signal is processed to determine that the user puts a hand on the mouth to make the mouth-covering gesture.

As an example, the mouth-covering gesture is one of a mouth-covering gesture with a left hand and a mouth-covering gesture with a right hand.

As an example, the mouth-covering gesture, according to a position of a palm relative to the mouth, is one of a mouth-covering gesture with the palm locating at a position between the mouth and a left ear, a mouth-covering gesture with the palm locating at a position between the mouth and a right ear, and a mouth-covering gesture with the palm locating at a position in front of the mouth.

As an example, the mouth-covering gesture is one of a mouth-covering gesture with touching a face and a mouth-covering gesture without touching a face.

Specifically, the mouth-covering gesture may include one of a mouth-covering gesture of the user covering the mouth by one hand to a left direction or a right direction; a mouth-covering gesture of the user covering the mouth by one hand touching the face, and covering the whole mouth; a mouth-covering gesture of the user covering the mouth by one hand touching the face, with a thumb being in contact with a side of the mouth, an index finger being on top of lips and the mouth exposed below a palm; a mouth-covering gesture of the user covering the mouth by one hand touching the face, with the thumb being in contact with the side of the mouth, a little finger touching the lower jaw and the mouth exposed above the palm; a mouth-covering gesture of the user covering the mouth with one hand without touching the face, and covering the whole mouth; a mouth-covering gesture of the user covering the mouth by one hand without touching the face, with the thumb being in contact with a side of the mouth, the index finger being on top of lips and the mouth exposed below the palm; and a mouth-covering gesture of the user covering the mouth by one hand without touching the face, with the thumb being in contact with the side of the mouth, the little finger touching the lower jaw and the mouth exposed above the palm.

Figure 2:
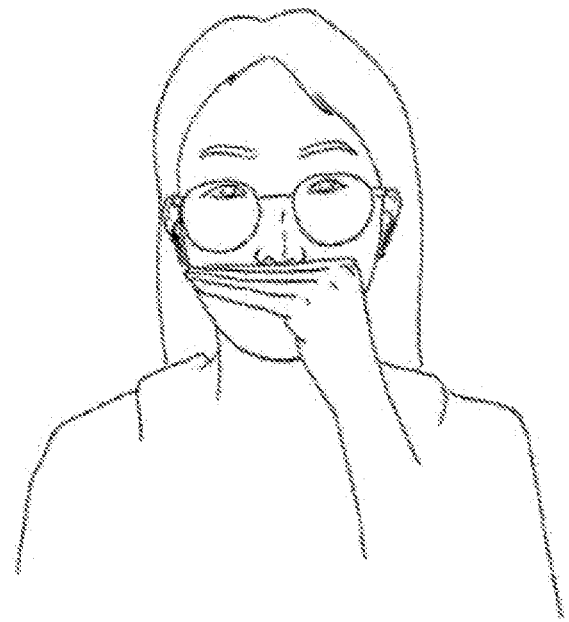
FIG. 2 is a front view of a triggering gesture of covering a mouth with a right hand to a left direction according to an embodiment of the present disclosure.
Figure 3:
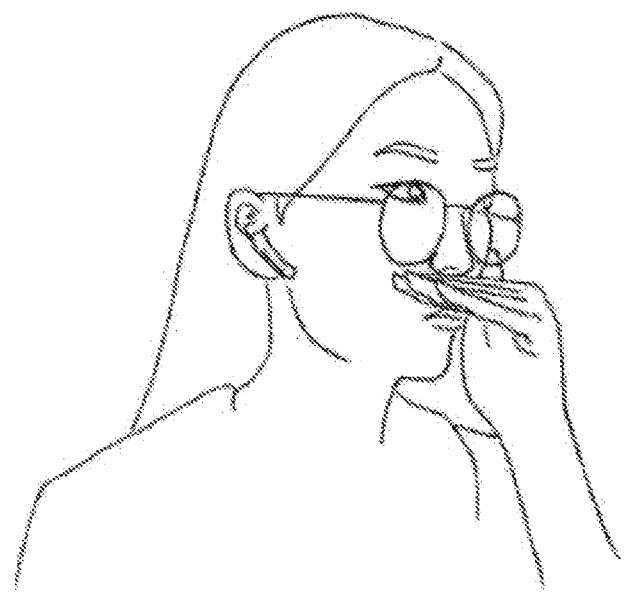
FIG. 3 is a side view of a triggering gesture of covering a mouth with a right hand to a left direction according to an embodiment of the present disclosure.
Figure 4:
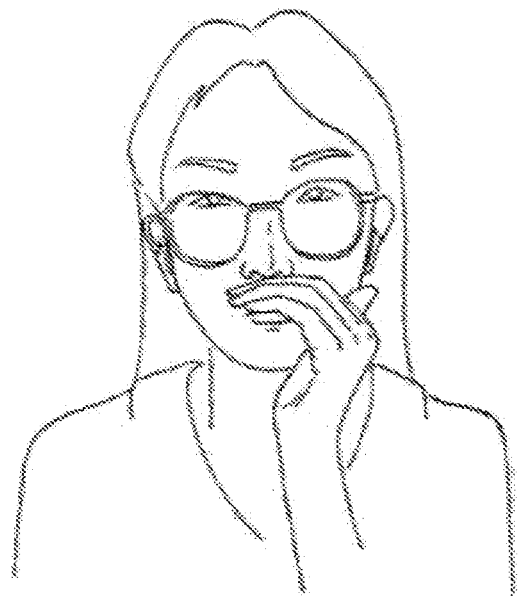
FIG. 4 is a schematic diagram showing a triggering gesture with four fingers under a nose according to an embodiment of the present disclosure.
Figure 5:
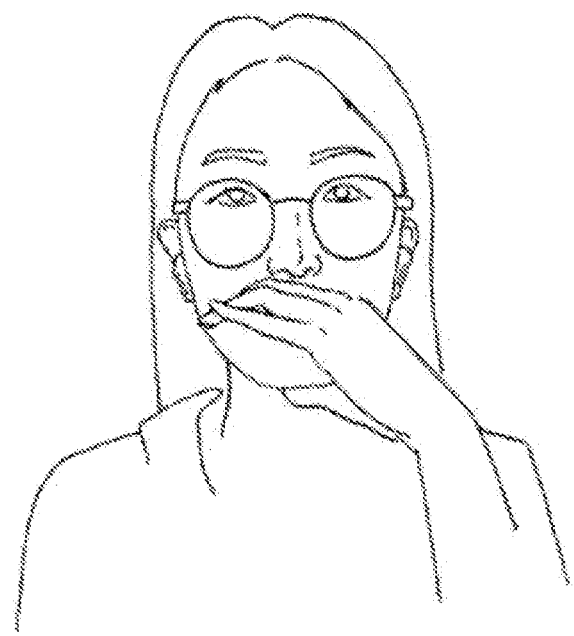
FIG. 5 is a schematic diagram showing a triggering gesture with a thumb against a chin according to an embodiment of the present disclosure.

FIGS. 2 to 5 show several cases in which the user puts one hand on the mouth to make a mouth-covering gesture to trigger an information input. FIG. 2 is a front view of a triggering gesture of covering a mouth with a right hand to a left direction, and FIG. 3 is a side view of a triggering gesture of covering a mouth with a right hand to a left direction. According to the gesture shown in FIG. 2 and FIG. 3, the user puts the left hand on the left side of the mouth and stretches fingers to cover the mouth to a left direction, with the thumb stretched upward and the other four fingers stretched to a left direction and putted at a position between the top of the lips and the bottom of the nose, that is, the upper and left sides of the mouth are blocked by the left hand. According to habits of different users, the four fingers except the thumb may be stretched to a position not beyond the right side of the nose or a position beyond the right side of the nose, and the thumb may be at a side of the face or against the chin. FIG. 4 is a schematic diagram showing a gesture with four fingers under the nose, and FIG. 5 is a schematic diagram showing a gesture with the thumb against the chin. Similar to the gesture of covering the mouth with the left hand to the right direction described above, positions and extensions of the thumb and other four fingers are different in the two gestures shown in FIG. 4 and FIG. 5. The above description of the triggering gestures is exemplary but not exhaustive. In addition, the triggering gesture is not limited to the disclosed gestures.

In step S102, in a case that the user puts the hand on the mouth to make the mouth-covering gesture, a mouth-covering gesture input mode is determined as an input mode for controlling an interaction to trigger a control command or trigger another input mode by executing a program on the intelligent electronic device. For example, in a case that the intelligent electronic device is an intelligent phone, a control command for muting the phone is triggered when it is detected by a front camera of the intelligent phone that the user puts a hand on the mouth to make a hand-covering gesture. In another design, the intelligent phone vibrates to prompt the user that a voice input mode is entered when it is detected that the user puts a hand on the mouth to make a hand-covering gesture, and then the user may input voice by speaking. For another example, the intelligent electronic device may be a wireless headset. It is determined that the user puts a hand on the mouth to make a hand-covering gesture by analyzing the difference in the signals of the microphone on the headset.

For example, in a case that the user keeps the mouth-covering gesture with a hand on the mouth, an interaction intention of the user is analyzed based on the mouth-covering gesture, an interaction content of a current application on the intelligent device and information of another input from the user.

That is, the intelligent electronic device determines the mouth-covering gesture of the user, determines a predetermined user intention (a command) corresponding to the mouth-covering gesture (the corresponding relationship may be defined based on the habits of the users), and perform a response to the command.

Specifically, the intelligent electronic device executes a control command in a case that the intelligent electronic device determines that the mouth-covering gesture is a predetermined mouth-covering gesture.

For example, in a case that the mouth-covering gesture, such as a mouth-covering gesture of covering the mouth to a left direction, is determined as a first predetermined mouth-covering gesture, the user intention is determined as a voice input intention, and the intelligent device receives and analyzes the voice input from the user keeping the mouth-covering gesture, and outputs a content corresponding to the voice input.

For example, in a case that the mouth-covering gesture, such as a mouth-covering gesture of covering the mouth to a right direction, is determined as a second predetermined mouth-covering gesture, the user intention is determined as a head movement input intention, and the intelligent device receives and analyzes the head movement input from the user keeping the mouth-covering gesture, and outputs a content corresponding to the head movement input.

For example, in a case that the mouth-covering gesture, such as a mouth-covering gesture of covering the whole mouth with one hand, is determined as a third predetermined mouth-covering gesture, the user intention is determined as an intention for executing a control command on the intelligent device. That is, the mouth-covering gesture of the user is converted to a control command by the intelligent device.

Based on different mouth-covering gestures, such as a mouth-covering gesture with the left hand and a mouth-covering gesture with the right hand, the intention of the user is determined to perform different control commands on the intelligent device. After recognizing a mouth-covering gesture of the user, the intelligent device obtains different control commands based on the different mouth-covering gestures.

In an embodiment, for different applications, different control commands or different modal information inputs are triggered by the mouth-covering gesture.

In an embodiment, for a mouth-covering gesture, such as a mouth-covering gesture with the left hand and a mouth-covering gesture with the right hand, different control commands or different modal information inputs are triggered for different applications based on the different mouth-covering gestures. The different modal information inputs or the other input includes one or a combination of a voice input, a non-mouth-covering gesture input, a sight input, a blink input and a head movement input.

As an example, the intelligent electronic device is configured to provide a visual feedback or an auditory feedback to prompt the user that the intelligent electronic device triggers the another input mode.

As an example, in a case that the triggered another input mode is a voice input mode, the intelligent electronic device processes a voice input from the user keeping the mouth-covering gesture. Further, in a case that the signal based on which it is determined that the user makes the mouth-covering gesture includes a voice signal of the user, the intelligent electronic device processes the voice signal as the voice input.

In an embodiment, in a case that the user performs interaction with the intelligent device based on the mouth-covering gesture, the signal is processed to determine whether the user stops making the mouth-covering gesture.

In a case that the user stops making the mouth-covering gesture, the interaction is ended.

In a case that the user puts one hand on the mouth to make a mouth-covering gesture, the intelligent electronic portable device detects and determines the position and gesture of the hand using sensors arranged on the device.

Hereinafter, descriptions are provided by taking some intelligent portable devices and sensors as examples, in which the determination of the user making a mouth-covering gesture is equivalent to the determination of the user triggering an information input.

First Embodiment

In the first embodiment, the intelligent portable device is a mobile phone and the sensor system includes a camera.

In this embodiment, the signal captured by the sensor system includes a face image captured by the camera. In a case that the signal includes the face image captured by the camera, one or more types of the mouth-covering gesture made by the user are determined.

For example, in a case that the mobile phone is provided with a front camera and an image of the user covering the mouth with one hand is captured, the mobile phone processes the image and determines that the user makes a mouth-covering gesture with one hand, and the mouth-covering gesture with one hand may be converted to a control command for the mobile phone, such as a command for muting the mobile phone.

Second Embodiment

In the second embodiment, the intelligent portable device is a mobile phone, the sensor system includes a camera, and a voice prompt is provided before input.

The front camera of the mobile phone captures an image of the user covering the mouth, and it is determined that the user makes a mouth-covering gesture with one hand. Based on the mouth-covering gesture, a voice input intention of the user is determined. A headset (in a case that the user wears a headset) or the mobile phone emits a sound to prompt the user to input voice. The user starts to input voice after hearing the sound.

Third Embodiment

In the third embodiment, the intelligent portable device is an intelligent wearable device of an intelligent watch, an intelligent ring, or a watch, and the sensor system includes a proximity sensor and a microphone.

Detection is performed by the proximity sensor and the microphone arranged on the intelligent watch or the intelligent ring. In a case that a detection result of the proximity sensor is a proximity result and the microphone receives a voice signal, it is determined that the user may make a mouth-covering gesture with one hand.

Fourth Embodiment

In the fourth embodiment, the intelligent portable device is mobile phone and/or a wire-controlled headset, and the sensor system includes a microphone.

Features, such as a nasal sound, a tone, and a volume, of the voice of the user recorded by the wire-controlled microphone are analyzed. In a case that the user makes a mouth-covering gesture with one hand, the voice is transmitted to the microphone through the hand. The features of the voice are significantly different from the features of the voice of the user without covering the mouth in the above aspects, so that it may be determined whether the user makes a mouth-covering gesture with one hand.

The features of the signal captured by the sensor system include one or more of a time domain feature, a frequency spectrum feature, and a sound source position feature of the sound signal received by a single microphone.

Fifth Embodiment

In the fifth embodiment, the intelligent portable device includes a mobile phone and a dual-Bluetooth headset, and the sensor system includes a dual-microphone group putted in both ears.

Sound signals received by two microphones are compared. Taking the gesture of covering the mouth with the left hand to the right direction as an example, the left hand of the user is putted at a position between the mouth and the left ear, so that a propagation path of the sound from the mouth to the left microphone is blocked. Therefore, the sound signal received by the left microphone and the sound signal received by the right microphone are significantly different in volume and in energy distribution at different frequencies, so that it may be determined based on the difference between the sound signals received by the left microphone and the right microphone that the user may make a mouth-covering gesture with one hand.

Sixth Embodiment

In the sixth embodiment, the intelligent portable device is a head-mounted display device, and the sensor system includes multiple microphones.

The user wears the head-mounted display device, and the head-mounted display device is provided with multiple microphones at different positions. Similar to the fifth embodiment, it may be determined whether the user makes a mouth-covering gesture with one hand by comparing sound signals captured at different positions.

Seventh Embodiment

In the seventh embodiment, a combination of signals captured by multiple sensors is used.

The user wears a wearable device near the hand, such as an intelligent watch or a ring, and wears an intelligent display device or a headset on the head. The wearable device is provided with a motion sensor and a direction sensor. The intelligent display device or the headset is provided with a direction sensor. An action of the user lifting a hand is determined by analyzing a signal of the motion sensor at the hand. A direction relationship between the head and the hand of the user is calculated by analyzing signals of the direction sensor on the head and on the hand. In a case that the direction relationship between the head and the hand meets requirements for the mouth-covering gesture, for example, in a case that a palm surface is almost parallel to a face surface, voice interaction is activated.

Eighth Embodiment

In the eighth embodiment, interaction is performed based on a combination of the mouth-covering gesture and other modal input.

According to this embodiment, in addition to executing a control command based on the mouth-covering gesture, interaction may be performed based on a combination of the mouth-covering gesture and other modal information. The other modal information may include one or a combination of a voice of the user, a head movement of the user, and an eye movement. For example, after the mouth-covering gesture is detected, voice input is triggered, and the user directly controls the intelligent electronic device with voice. For another example, after the mouth-covering gesture is detected, the head movement input is activated, and the user performs a determination operation by nodding. In this way, other modal input may be conveniently and accurately triggered by the mouth-covering gesture.

In a case that the signal includes an image near the face captured by a camera, after the user makes the mouth-covering gesture and before provided another modal input, the mouth-covering gesture is determined by performing image processing, and then the interaction intention of the user is determined.

In an example, before the user provides another modal input, a prompt including a visual prompt or an auditory prompt is provided to determine whether the another modal input is activated.

Ninth Embodiment

In the ninth embodiment, a combination of signals of multiple sensors is used.

In the embodiment, the intelligent electronic portable device may be provided with the above sensors, and may include but not limited to a microphone, a dual/multi-microphone group, a camera, and a proximity sensor. The combination of signals of multiple sensors is used, achieving a higher accuracy and a higher recall rate of detection and determination of whether to activate voice input. In addition, based on the signals of various sensors, the present disclosure may be applied to various intelligent electronic portable devices and may be applied to multiple situations.

It should be noted that the features of the signal captured by the sensor system include one or more of a time domain feature, a frequency spectrum feature or a sound source position feature of the sound signal received by the microphone.

According to another embodiment of the present disclosure, an interaction method performed by an intelligent electronic device is provided. The intelligent electronic device includes a sensor system for capturing a signal of a user putting one hand on the mouth to make a mouth-covering gesture. The interaction method performed by the intelligent electronic device includes: processing the signal to determine that the user puts one hand on the mouth to make the mouth-covering gesture; in a case that the user keeps the mouth-covering gesture with a hand on the mouth, analyzing an interaction intention of the user based on the mouth-covering gesture, an interaction content of a current application on the intelligent device and information inputted in another input mode by the user; based on the analyzed interaction intention, receiving and analyzing, by the intelligent device, information inputted by the user, and outputting, by the intelligent device, a corresponding content; in a case that the user performs interaction with the intelligent device based on the mouth-covering gesture, processing the signal to determine that the user stops making the mouth-covering gesture; and ending the interaction in a case that the user stops making the mouth-covering gesture.

As an example, the outputted content may include one or a combination of a voice and an image.

The information inputted by the user may include information of the mouth-covering gesture and other modal information, that is, other inputted information.

As an example, the other modal information or the other input information may include a voice input, a non-mouth-covering gesture input, a sight input, a blink input, a head movement input, or a combination thereof.

An example of an application scenario is described in the following. A scenario in which a user in a public place carries an intelligent phone and wears a dual-Bluetooth headset is taken as an example. The user wants to query the weather of the day by voice input. According to the present disclosure, the user puts one hand on the mouth to make a mouth-covering gesture, and says "how is the weather today?". With the above method, the intelligent phone determines the gesture of the user covering the mouth with one hand and obtains the content of the voice input, and the intelligent phone outputs a content of weather information via the headset. In this way, the user queries information without touching the mobile phone or performing operations on the interface of the mobile phone, wakes up the voice interaction without speaking a specific wake-up word. In addition, with the mouth-covering gesture according to the present disclosure, interference to others around due to voice input is reduced, and the privacy of voice input of the user is protected, conforming to habit and cognition of daily language communication of the user. The mouth-covering gesture is simple and natural.

In summary, the technical solutions according to the embodiments of the present disclosure have one or more of the following advantages.

1. Natural interaction. Interaction is triggered by the user making a mouth-covering gesture, conforming to the habits and cognition of the user.

2. High efficiency. Operation can be performed with one hand. It is unnecessary for the user to operate the device, switch between different user interfaces/applications, hold down a button, or repeat a wake-up word. It is only required for the user to raise a hand to the mouth.

3. High privacy and sociality. The user makes a mouth-covering gesture and inputs voice, causing little interference to others, achieving privacy protection, and reducing psychological burden of the user inputting voice.

The types of the sensors are exemplary rather than restrictive. In summary, the sensor system includes one or more of: a camera, an infrared camera, a depth camera, a microphone, a dual-microphone group, a multi-microphone group, a proximity-sensor, and an accelerometer.

The embodiments of the present disclosure are described above. The above description is exemplary rather than exhaustive, and is not limited to the disclosed embodiments. Without departing from the scope and spirit of the embodiments of the present disclosure, many modifications and variations are apparent to those skilled in the art. Therefore, the protection scope of the present disclosure should be subject to the protection scope of the claims.

The invention claimed is:

1. An intelligent electronic device, comprising:
a sensor system, configured to capture a signal for determining that a user puts a hand on a mouth of the user to make a mouth-covering gesture;
a processor; and
a memory storing computer executable instructions, wherein the computer executable instructions, when executed by the processor, cause the processor, to perform a voice interaction wakeup method, and the voice interaction wakeup method comprises:
processing the signal to determine whether the user puts the hand on the mouth to make the mouth-covering gesture; and
in response to determining that the user puts the hand on the mouth to make the mouth-covering gesture, triggering to enter a voice input interaction, to process a voice input from the user keeping the mouth-covering gesture and respond to the voice input, by executing a program on the intelligent electronic device.

2. The intelligent electronic device according to claim 1, wherein the mouth-covering gesture is one of a mouth-covering gesture with a left hand and a mouth-covering gesture with a right hand.

3. The intelligent electronic device according to claim 1, wherein the mouth-covering gesture, according to a position of a palm relative to the mouth, is one of a mouth-covering gesture with the palm locating at a position between the mouth and a left ear, a mouth-covering gesture with the palm locating at a position between the mouth and a right ear, and a mouth-covering gesture with the palm locating at a position in front of the mouth.

4. The intelligent electronic device according to claim 1, wherein the mouth-covering gesture is one of a mouth-covering gesture with touching a face and a mouth-covering gesture without touching a face.

5. The intelligent electronic device according to claim 1, wherein the mouth-covering gesture comprises one of:
a mouth-covering gesture with the palm covering the whole mouth;
a mouth-covering gesture with a thumb being in contact with a side of the mouth, an index finger being on top of lips and the mouth exposed below the palm;
a mouth-covering gesture with the thumb being in contact with a lower jaw, the index finger being on the top of the lips and the mouth exposed below the palm; and
a mouth-covering gesture with the thumb being in contact with the side of the mouth, a little finger touching the lower jaw and the mouth exposed above the palm.

6. The intelligent electronic device according to claim 1, wherein the intelligent electronic device is configured, in a case that the intelligent electronic device determines that the mouth-covering gesture is a predetermined mouth-covering gesture, to execute a control command.

7. The intelligent electronic device according to claim 6, wherein the control command is executed to trigger the another input mode except the mouth-covering gesture input mode to process information inputted in the another input mode.

8. The intelligent electronic device according to claim 7, wherein the another input mode comprises one or a combination of a voice input mode, a non-mouth-covering gesture input mode, a sight input mode, a blink input mode, and a head movement input mode.

9. The intelligent electronic device according to claim 1, wherein the intelligent electronic device is configured to:
process the signal to determine whether the user stops making the mouth-covering gesture; and
end the voice input interaction in a case that the user stops making the mouth-covering gesture.

10. The intelligent electronic device according to claim 1, wherein the intelligent electronic device is configured to provide a visual feedback or an auditory feedback to prompt the user that the intelligent electronic device triggers to enter the voice input interaction.

11. The intelligent electronic device according to claim 1, wherein the intelligent electronic device is configured, in a case that the signal comprises a face image captured by a camera, to recognize one or more types of the mouth-covering gesture made by the user.

12. The intelligent electronic device according to claim 1, wherein features of the signal captured by the sensor system comprise one or more of a time domain feature, a frequency spectrum feature and a sound source position feature of a sound signal received by a single microphone.

13. The intelligent electronic device according to claim 1, wherein features of the signal captured by the sensor system comprise differences of features of sound signals received by a plurality of microphones.

14. The intelligent electronic device according to claim 13, wherein the intelligent electronic device is configured, in a case that a sensing device is a wireless headset, to recognize the mouth-covering gesture based on a difference between a signal of a left headphone and a signal of a right headphone.

15. A voice interaction wakeup method performed by an intelligent electronic device, wherein the intelligent electronic device comprises a sensor system for capturing a signal of a user putting one hand on a mouth to make a mouth-covering gesture, and the voice interaction wakeup method performed by the intelligent electronic device comprises:
- processing the signal to determine that the user puts one hand on the mouth to make the mouth-covering gesture;
- in response to determining that the user keeps the mouth-covering gesture with a hand on the mouth, triggering to enter a voice input interaction, analyzing an interaction intention of the user based on the mouth-covering gesture, an interaction content of a current application on the intelligent device and information inputted in the voice input interaction by the user;
- based on the analyzed interaction intention, receiving and analyzing, by the intelligent device, information inputted by the user, and outputting, by the intelligent device, a corresponding content;
- in a case that the user performs interaction with the intelligent device based on the mouth-covering gesture, processing the signal to determine that the user stops making the mouth-covering gesture; and
- ending the voice input interaction in a case that the user stops making the mouth-covering gesture.

16. The interaction method according to claim 15, wherein the information inputted by the user comprises information of the mouth-covering gesture and other modal information of the user.

17. The interaction method according to claim 16, wherein the other modal information comprises voice information or eye contact information.

18. A non-transitory computer readable medium storing computer executable instructions, wherein the computer executable instructions, when executed by a computer, cause the computer to perform the voice interaction wakeup method according to claim 15.

* * * * *